(12) United States Patent
Radcliffe et al.

(10) Patent No.: US 7,160,586 B2
(45) Date of Patent: Jan. 9, 2007

(54) CHOLESTERIC LIQUID CRYSTAL COPOLYMERS AND ADDITIVES

(75) Inventors: Marc D. Radcliffe, Newport, MN (US); Richard J. Pokorny, Maplewood, MN (US); Terence D. Spawn, Stillwater, MN (US); Steven D. Solomonson, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 356 days.

(21) Appl. No.: 10/652,700

(22) Filed: Aug. 29, 2003

(65) Prior Publication Data

US 2005/0045854 A1    Mar. 3, 2005

(51) Int. Cl.
     *C09K 19/36*      (2006.01)
     *C09K 19/38*      (2006.01)
     *G02B 5/30*      (2006.01)

(52) U.S. Cl. ............. 428/1.3; 428/1.31; 428/1.33; 252/299.7

(58) Field of Classification Search ............ 428/1.1, 428/1.3, 1.31, 1.33; 252/299.01, 299.7
See application file for complete search history.

(56) References Cited

U.S. PATENT DOCUMENTS 4,293,435 A     10/1981    Portugall et al.

(Continued)

FOREIGN PATENT DOCUMENTS

EP      0 357 850     3/1990

(Continued)

OTHER PUBLICATIONS

English abstract for JP 2000-144132.*

(Continued)

*Primary Examiner*—Shean C Wu
(74) *Attorney, Agent, or Firm*—Anna A. Wetzels

(57) ABSTRACT

A cholesteric liquid crystal composition includes a) a cholesteric liquid crystal compound or a cholesteric liquid crystal precursor; and b) a compound of formula (I), formula (II) or formula (III):

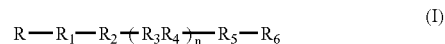
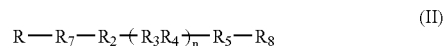
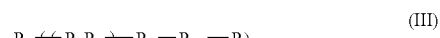

where, n is 1, 2, 3, or 4; m is 1, 2, or 3; R is an acrylate, methacrylate, acrylamide, isocyanate, epoxy, or silane; $R_1$ is a $(C_3-C_8)$ alkylene, $(C_3-C_8)$ alkenylene, or $(C_3-C_8)$ alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, $(C_1-C_8)$ alkylene, $(C_2-C_8)$ alkenylene, $(C_2-C_8)$ alkylyne, carbonyl, —O—, —C(O)O—, —O(O)C—, —OC(O)O—, —C(O)N—, —CH=N—, —N=CH—, or —NC(O)—; $R_5$ is a bond, cycloalkylene, cycloalkenylene, hetrocyclylene, arylene, or hetroarylene; $R_6$ is hydrogen, cyano, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$; $R_7$ is a $(C_1-C_2)$ alkylene, $(C_2)$ alkenylene, or $(C_2)$ alkylyne; $R_8$ is is hydrogen, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$; $R_9$ is a cycloalkylene, cycloalkenylene, heterocyclylene, arylene, or hetroarylene; and $R_{10}$ is a $(C_1-C_8)$ alkylene, $(C_2-C_8)$ alkenylene, or $(C_2-C_8)$ alkylyne.

15 Claims, 2 Drawing Sheets

U.S. PATENT DOCUMENTS

| | | | |
|---|---|---|---|
| 4,974,941 A | 12/1990 | Gibbons et al. | |
| 5,032,009 A | 7/1991 | Gibbons et al. | |
| 5,332,522 A | 7/1994 | Chen et al. | |
| 5,389,698 A | 2/1995 | Chigrinov et al. | |
| 5,581,905 A | 12/1996 | Huelsman et al. | |
| 5,602,661 A | 2/1997 | Schadt et al. | |
| 5,694,701 A | 12/1997 | Huelsman et al. | |
| 5,744,057 A | 4/1998 | Meyer et al. | |
| 5,780,629 A | 7/1998 | Etzbach et al. | |
| 5,838,407 A | 11/1998 | Chigrinov et al. | |
| 5,847,068 A | 12/1998 | Maxein et al. | |
| 5,886,242 A | 3/1999 | Etzbach et al. | |
| 5,958,293 A | 9/1999 | Gibbons et al. | |
| 6,099,758 A * | 8/2000 | Verrall et al. | 252/585 |
| 6,103,323 A * | 8/2000 | Motomura et al. | 428/1.3 |
| 6,134,808 A | 10/2000 | Yapel et al. | |
| 6,153,722 A | 11/2000 | Schoenfeld et al. | |
| 6,395,354 B1 | 5/2002 | Sahouani et al. | |
| 6,671,031 B1 * | 12/2003 | Nishimura | 349/201 |
| 6,876,427 B1 * | 4/2005 | Bowley et al. | 349/185 |
| 6,913,708 B1 * | 7/2005 | Solomonson et al. | 252/299.01 |
| 6,917,399 B1 * | 7/2005 | Pokorny et al. | 349/96 |
| 7,011,775 B1 * | 3/2006 | Motomura et al. | 264/1.34 |
| 2002/0113937 A1 | 8/2002 | Pokorny et al. | |
| 2002/0159019 A1 | 10/2002 | John et al. | |
| 2003/0063245 A1 | 4/2003 | Bowley et al. | |
| 2003/0152712 A1 * | 8/2003 | Motomura et al. | 427/402 |

FOREIGN PATENT DOCUMENTS

| | | | |
|---|---|---|---|
| EP | 0 834 754 | | 3/1997 |
| EP | 1055721 | * | 11/2000 |
| EP | 1 256 617 | | 11/2002 |
| GB | 2357291 | | 6/2000 |
| GB | 2359809 | | 9/2000 |
| JP | 2000073063 | | 3/2000 |
| JP | 2000-144132 | * | 5/2000 |
| JP | 2000144132 | | 5/2000 |
| JP | 2001213919 | | 8/2001 |
| JP | 2001316668 | | 11/2001 |
| JP | 2001318225 | | 11/2001 |
| JP | 2001354733 | | 12/2001 |
| JP | 2001354734 | | 12/2001 |
| JP | 2002-322273 | | 11/2002 |
| WO | WO 9945082 | | 9/1999 |

OTHER PUBLICATIONS

P. Van De Witte, M. Brechmer, J. Lub: LCD Component Obtained by Patterning of Chiral Nematic Polymer Layers, J. Mater. Chem., vol. 9, 1999, pp. 2087-2094, XP00231393, Copolymers of 2 and 3, table 2, Paragraph 2.2, Figure 12.

Cowie, JMG et al: Liquid-crystal Side-Chain Copolymers Composed on a Non-Chiral Mesogenic Monomer and a Chiral Non-Mesogenic Monomer—Polymer, Elsevier Science Publishers BV GB, vol. 36, No. 21, 1995, pp. 4147-4149, XP004025539 ISSN: 0032-3861, p. 4149, left column, line 9 Copolymers 3.

Kelly, SM: Anisotropic Networks, Journal of Materials Chemistry, The Royal Society of Chemistry, Cambridge, GB, vol. 5, No. 12, 1995, pp. 2047-2061, XP009018041 ISSN: 0959-9428.

* cited by examiner

CHOLESTERIC LIQUID CRYSTAL COPOLYMERS AND ADDITIVES

FIELD OF THE INVENTION

The invention generally relates to cholesteric liquid crystal compositions for forming cholesteric liquid crystal films and optical bodies such as reflective polarizers, and particularly relates to cholesteric liquid crystal copolymers and additives for inclusion in cholesteric liquid crystal compositions.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display brightness and can require high power consumption.

Reflective polarizers have been developed for use in these displays as well as other applications. Reflective polarizers preferentially reflect light having one polarization and transmit light of the opposite or orthogonal polarization. The reflected light has the ability to be recycled, making it possible to have a higher percentage of the light converted to polarized light and consequently a higher transmission of light. It is preferred that reflective polarizers transmit and reflect light without absorbing relatively large amounts of the light. Preferably, the reflective polarizer has no more than 10% absorption for the transmission polarization over the desired range of wavelengths. Most LCD's operate over a broad range of wavelengths and, as a consequence, the reflective polarizer must typically operate over that broad wavelength range, as well.

The invention provides compositions and methods of making optical bodies for use in such applications.

SUMMARY OF THE INVENTION

Generally, the present invention relates to optical bodies for displays, such as liquid crystal displays, as well as the displays and other devices containing the optical bodies.

In one embodiment, a cholesteric liquid crystal composition includes a) a cholesteric liquid crystal compound or a cholesteric liquid crystal precursor; and b) a compound of formula (I), formula (II) or formula (III):

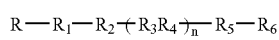  (I)

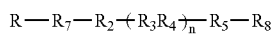  (II)

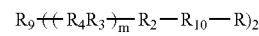  (III)

where n is 1, 2, 3, or 4; m is 1, 2, or 3; R is an acrylate, methacrylate, acrylamide, isocyanate, epoxy, or silane; $R_1$ is a $(C_3-C_8)$ alkylene, $(C_3-C_8)$ alkenylene, or $(C_3-C_8)$ alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, $(C_1-C_8)$ alkylene, $(C_2-C_8)$ alkenylene, $(C_2-C_8)$ alkylyne, carbonyl, —O—, —C(O)O—, —O(O)C—, —OC(O)O—, —C(O)N—, —CH=N—, —N=CH—, or —NC(O)—; $R_5$ is a bond, cycloalkylene, cycloalkenylene, hetrocyclylene, arylene, or hetroarylene; $R_6$ is hydrogen, cyano, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$; $R_7$ is a $(C_1-C_2)$ alkylene, $(C_2)$ alkenylene, or $(C_2)$ alkylyne; $R_8$ is is hydrogen, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$; $R_9$ is a cycloalkylene, cycloalkenylene, heterocyclylene, arylene, or hetroarylene; and $R_{10}$ is a $(C_1-C_8)$ alkylene, $(C_2-C_8)$ alkenylene, or $(C_2-C_8)$ alkylyne.

Another embodiment is a cholesteric liquid crystal composition that includes a reaction product of a) a cholesteric liquid crystal precursor; and b) a compound of formula (I), formula (II) or formula (III).

In a further embodiment, a cholesteric liquid crystal film includes a cholesteric liquid crystal polymer; and a compound of formula (IV):

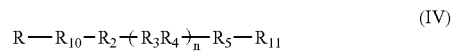  (IV)

where, n is 1, 2, 3, or 4; R is an acrylate, methacrylate, acrylamide, isocyanate, epoxy, or silane; $R_{10}$ is $(C_1-C_8)$ alkylene, $(C_1-C_8)$ alkenylene, or $(C_1-C_8)$ alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, $(C_1-C_8)$ alkylene, $(C_2-C_8)$ alkenylene, $(C_2-C_8)$ alkylyne, carbonyl, —O—, —C(O)O—, —O(O)C—, —OC(O)O—, —C(O)N—, —CH=N—, —N=CH—, or —NC(O)—; $R_5$ is a bond, cycloalkylene, cycloalkenylene, hetrocyclylene, arylene, or hetroarylene; and $R_{11}$ is hydrogen, cyano, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$.

In another embodiment, a method of forming a cholesteric liquid crystal film includes disposing any of the cholesteric liquid crystal compositions described above on a substrate; and aligning the cholesteric liquid crystal composition to form a cholesteric liquid crystal film.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
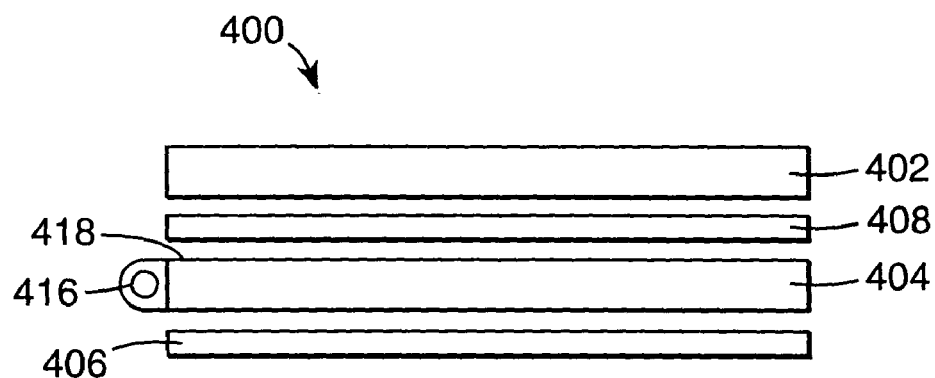
FIG. 1 is a schematic illustration of one embodiment of a liquid crystal display in accordance with the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The polymeric optical film of the present invention is believed to be applicable to optical compensators for displays, such as liquid crystal displays, as well as the displays and other devices containing the optical compensators. While the present invention is not so limited, an appreciation of various aspects of the invention will be gained through a discussion of the examples provided below.

For the following defined terms, these definitions shall be applied, unless a different definition is given in the claims or elsewhere in this specification.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like.

As used herein, the term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the tern "alkenylene" refers to a straight or branched chain divalent hydrocarbon radical having one or more carbon-carbon double bonds and optionally containing one or more heteroatomic substitutions independently selected from S, O, Si, or N. Alkenylene groups generally include those with two to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched chain divalent hydrocarbon radical having one or more carbon-carbon triple bonds and optionally containing one or more heteroatomic substitutions independently selected from S, O, Si, or N. Alkylyne groups generally include those with two to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, "cycloalkyl" refers to an alicyclic hydrocarbon group. Cycloalkyl groups generally include those with three to twelve carbon atoms. Cycloalkyl groups may be unsubstituted or substituted with those substituents that do not interfere with the specified function of the composition. Substituents include alkoxy, hydroxy, mercapto, amino, alkyl substituted amino, or halo, for example. Such a cycloalkyl ring may be optionally fused to one or more of another heterocyclic ring(s), heteroaryl ring(s), aryl ring(s), cycloalkenyl ring(s), or cycloalkyl rings. Examples of "cycloalkyl" as used herein include, but are not limited to, cyclopropyl, cyclobutyl, cyclopentyl, cyclohexyl, cycloheptyl, or cyclooctyl, and the like.

As used herein, the term "cycloalkenyl" refers to an alicyclic monovalent hydrocarbon radical having at least one carbon carbon double bond in the ring system. Cycloalkenyl groups generally include those with three to twelve carbon atoms. Cycloalkenyl groups may be unsubstituted or substituted with those substituents that do not interfere with the specified function of the composition. Substituents include alkoxy, hydroxy, mercapto, amino, alkyl substituted amino, or halo, for example. Such a cycloalkenyl ring may be optionally fused to one or more of another heterocyclic ring(s), heteroaryl ring(s), aryl ring(s), cycloalkenyl ring(s), or cycloalkyl rings. Examples of "cycloalkenyl" as used herein include, but are not limited to, cyclopentenyl, cyclohexenyl, and the like.

As used herein, the term "cycloalkylene" refers to an alicyclic divalent hydrocarbon radical. Cycloalkylene groups generally include those with three to twelve carbon atoms. Cycloalkylene groups may be unsubstituted or substituted with those substituents that do not interfere with the specified function of the composition. Substituents include alkoxy, hydroxy, mercapto, amino, alkyl substituted amino, or halo, for example. Such a cycloalkylene ring may be optionally fused to one or more of another heterocyclic ring(s), heteroaryl ring(s), aryl ring(s), cycloalkenyl ring(s), or cycloalkyl rings. Examples of "cycloalkylene" as used herein include, but are not limited to, cyclopropyl-11-diyl, cyclopropyl-1,2-diyl, cyclobutyl-1,2-diyl, cyclopentyl-1,3-diyl, cyclohexyl-1,2-diyl, cyclohexyl-1,3-diyl cyclohexyl-1,4-diyl, cycloheptyl-1,4-diyl, or cyclooctyl-1,5-diyl, and the like.

As used herein, the term "cycloalkenylene" refers to a substituted alicyclic divalent hydrocarbon radical having at least one carbon-carbon double bond in the ring system. Cycloalkenylene groups generally include those with three to twelve carbon atoms. Cycloalkenylene groups may be unsubstituted or substituted with those substituents that do not interfere with the specified function of the composition. Substituents include alkoxy, hydroxy, mercapto, amino, alkyl substituted amino, or halo, for example. Such a cycloalkenylene ring may be optionally fused to one or more of another heterocyclic ring(s), heteroaryl ring(s), aryl ring(s), cycloalkenyl ring(s), or cycloalkyl rings. Examples of "cycloalkenylene" as used herein include, but are not limited to, 4,5-cyclopentene-1,3-diyl, 4,5-cyclohexene-1,2-diyl, and the like.

As used herein, the term "heterocyclic" or the term "heterocyclyl" refers to a monovalent three to twelve-membered non-aromatic ring containing one or more heteroatomic substitutions independently selected from S, O, or N and having zero to five degrees of unsaturation. Heterocyclyl groups may be unsubstituted or substituted with those substituents that do not interfere with the specified function of the composition. Substituents include alkoxy, hydroxy, mercapto, amino, alkyl substituted amino, or halo, for example. Such a heterocyclic ring may be optionally fused to one or more of another heterocyclic ring(s), heteroaryl ring(s), aryl ring(s), cycloalkenyl ring(s), or cycloalkyl rings. Examples of "heterocyclic" as used herein include, but are not limited to, tetrahydrofuryl, pyranyl, 1,4-dioxanyl, 1,3-dioxanyl, piperidinyl, pyrrolidinyl, morpholinyl, tetrahydrothiopyranyl, tetrahydrothiophenyl, and the like.

As used herein, the term "heterocyclylene" refers to a divalent three to twelve membered non-aromatic heterocyclic ring radical containing one or more heteroatoms independently selected from S, O, or N and having zero to five degrees of unsaturation. Heterocyclylene groups may be unsubstituted or substituted with those substituents that do not interfere with the specified function of the composition. Substituents include alkoxy, hydroxy, mercapto, amino, alkyl substituted amino, or halo, for example. Such a heterocyclylene ring may be optionally fused to one or more of another heterocyclic ring(s), heteroaryl ring(s), aryl ring(s), cycloalkenyl ring(s), or cycloalkyl rings. Examples of "heterocyclylene" as used herein include, but are not limited to, tetrahydrofuran-2,5-diyl, morpholine-2,3-diyl, pyran-2,4-diyl, 1,4-dioxane-2,3-diyl, 1,3-dioxane-2,4-diyl, piperidine-2,4-diyl, piperidine-1,4-diyl, pyrrolidine-1,3-diyl, morpholine-2,4-diyl, and the like.

As used herein, the term "aryl" refers to monovalent unsaturated aromatic carbocyclic radicals having a single ring, such as phenyl, or multiple condensed rings, such as naphthyl or anthryl. Aryl groups may be unsubstituted or substituted with those substituents that do not interfere with the specified function of the composition. Substituents include alkoxy, hydroxy, mercapto, amino, alkyl substituted amino, or halo, for example. Such an aryl ring may be optionally fused to one or more of another heterocyclic ring(s), heteroaryl ring(s), aryl ring(s), cycloalkenyl ring(s), or cycloalkyl rings. Examples of "aryl" as used herein include, but are not limited to, phenyl, 2-naphthyl, 1-naphthyl, biphenyl, 2-hydroxyphenyl, 2-aminophenyl, 2-methoxyphenyl and the like.

As used herein, the term "arylene" refers to divalent unsaturated aromatic carbocyclic radicals having a single ring, such as phenylene, or multiple condensed rings, such as naphthylene or anthrylene. Arylene groups may be unsubstituted or substituted with those substituents that do not interfere with the specified function of the composition. Substituents include alkoxy, hydroxy, mercapto, amino, alkyl substituted amino, or halo, for example. Such an "arylene" ring may be optionally fused to one or more of another heterocyclic ring(s), heteroaryl ring(s), aryl ring(s), cycloalkenyl ring(s), or cycloalkyl rings. Examples of "arylene" as used herein include, but are not limited to, benzene-1,2diyl, benzene-1,3-diyl, benzene-1,4-diyl, naphthalene-1,8-diyl, anthracene-1,4-diyl, and the like.

As used herein, the term "heteroaryl" refers to a monovalent five- to seven-membered aromatic ring radical containing one or more heteroatoms independently selected from S, O, or N. Heteroaryl groups may be unsubstituted or substituted with those substituents that do not interfere with the specified function of the composition. Substituents include alkoxy, hydroxy, mercapto, amino, alkyl substituted amino, or halo, for example. Such a "heteroaryl" ring may be optionally fused to one or more of another heterocyclic ring(s), heteroaryl ring(s), aryl ring(s), cycloalkenyl ring(s), or cycloalkyl rings. Examples of "heteroaryl" used herein include, but are not limited to, furyl, thiophenyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl, pyridazinyl, pyrazinyl, pyrimidinyl, quinolinyl, isoquinolinyl, benzofuryl, benzothiophenyl, indolyl, and indazolyl, and the like.

As used herein, the term "heteroarylene" refers to a divalent five- to seven-membered aromatic ring radical containing one or more heteroatoms independently selected from S, O, or N. Heteroarylene groups may be unsubstituted or substituted with those substituents that do not interfere with the specified function of the composition. Substituents include alkoxy, hydroxy, mercapto, amino, alkyl substituted amino, or halo, for example. Such a "heteroarylene" ring may be optionally fused to one or more of another heterocyclic ring(s), heteroaryl ring(s), aryl ring(s), cycloalkenyl ring(s), or cycloalkyl rings. Examples of "heteroarylene" used herein include, but are not limited to, furan-2,5-diyl, thiophene-2,4-diyl, 1,3,4-oxadiazole-2,5-diyl, 1,3,4-thiadiazole-2,5-diyl, 1,3-thiazole-2,4-diyl, 1,3-thiazole-2,5-diyl, pyridine-2,4-diyl, pyridine-2,3-diyl, pyridine 2,5-diyl, pyrimidine-2,4-diyl, quinoline-2,3-diyl, and the like.

As used herein, the term "halogen" or "halo" shall include iodine, bromine, chlorine and fluorine.

As used herein, the terms "mercapto" and "sulfhydryl" refer to the substituent —SH.

As used herein, the term "hydroxy" refers to the substituent —OH.

A used herein, the term "amino" refers to the substituent —$NH_2$.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "copolymer" refers to a polymer formed from two or more monomers having different structures.

The term "polarization" refers to plane polarization, circular polarization, elliptical polarization, or any other nonrandom polarization state in which the electric vector of the beam of light does not change direction randomly, but either maintains a constant orientation or varies in a systematic manner. In-plane polarization refers to the electric vector remaining in a single plane, while in circular or elliptical polarization, the electric vector of the beam of light rotates in a systematic manner.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Cholesteric liquid crystal material generally includes chiral molecules or moieties, or a mixture of chiral and achiral molecules and can include monomers, polymers, oligomers, non-monomeric molecules, or any combination thereof. Examples of non-monomeric molecules can be found in U.S. Ser. No. 10/373,213 that is incorporated by reference herein. Examples of chiral and achiral molecule mixtures can be found in U.S. Ser. No. 10/373,126 that is incorporated by reference herein. Cholesteric liquid crystal material can include one or more cholesteric liquid crystal compounds (including cholesteric liquid crystal polymers), one or more cholesteric liquid crystal precursors (which can be used to form cholesteric liquid crystal compounds), or combinations thereof. Cholesteric liquid crystal compounds generally include at least one molecular unit that is chiral in nature (i.e., does not possess a plane of symmetry) and at least one molecular unit that is mesogenic in nature (i.e., exhibits a liquid crystal phase). Cholesteric liquid crystal compounds are also referred to as chiral nematic liquid crystal compounds. Cholesteric liquid crystal compounds can form a cholesteric liquid crystal phase in which the molecular and optical director (i.e., the unit vector in the direction of average local molecular alignment) of the liquid crystal rotates in a helical fashion along the dimension (the helical axis) perpendicular to the director.

The pitch of the cholesteric liquid crystal layer is the distance (in a direction perpendicular to the director) that it takes for the director or mesogen to rotate through 360°. This distance is generally 250 to 600 nm or more. The pitch of a cholesteric liquid crystal layer can typically be altered by mixing or otherwise combining (e g., by copolymerization) in various proportions, at least one chiral compound (e.g., a cholesteric liquid crystal compound or chiral cholesteric liquid crystal precurser) with another typically nematic liquid crystal compound. In such a case, the pitch depends on the relative ratios, by molarity or weight, of the chiral compound in the cholesteric liquid crystal composition. The pitch is generally selected to be on the order of the wavelength of light of interest. The helical twist of the director results in a spatially periodic variation in the dielectric tensor, which in turn gives rise to the wavelength selective reflection of light. For example, the pitch can be selected such that the selective reflection occurs in the visible, ultraviolet, or infrared wavelengths of light or combinations thereof.

Cholesteric liquid crystal compounds and precursors, including cholesteric liquid crystal polymers, are generally known and any cholesteric liquid crystal compound or precursor known to those of skill in the art can be used in compositions of the invention. Examples of suitable cholesteric liquid crystal compounds and precursors are described in U.S. Pat. Nos. 4,293,435, 5,332,522, 5,886,242, 5,847,068, 5,780,629, and 5,744,057, all of which are incorporated herein by reference. An example of an achiral molecular unit is a compound of formula C2:

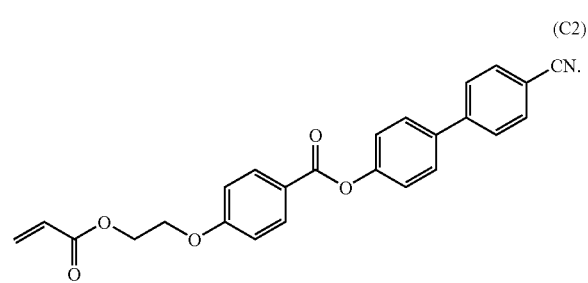

(C2)

Formula C2 can be prepared as described in European Patent Application Publication No. 834754, incorporated herein by reference. An example of commercially available achiral molecular unit is Paliocolor LC242, available from BASF, Charlotte, N.C. An example of commercially available chiral molecular unit is Paliocolor LC756, available from BASF, Charlotte, N.C. However, other cholesteric liquid crystal compounds and precursors not disclosed therein can also be utilized in compositions of the invention.

Generally, a cholesteric liquid crystal compound or precursor is selected, at least in part, based on the particular application or optical body that it is ultimately to be used in. Examples of characteristics that can be considered in the choice of cholesteric liquid crystal compounds or precursors include but are not limited to: refractive indices, pitch, processability, clarity, color, low absorption in the wavelength region of interest, compatibility with other components (e.g., a nematic liquid crystal compound), ease of manufacture, availability of the cholesteric liquid crystal compound, precursor, or monomers to form a cholesteric liquid crystal polymer, rheology, method and requirements of curing, ease of solvent removal, physical and chemical properties (e.g., flexibility, tensile strength, solvent resistance, scratch resistance, and phase transition temperature), and ease of purification.

Cholesteric liquid crystal compounds that are cholesteric liquid crystal polymers are typically formed using chiral molecules or a mixture of chiral and achiral molecules (including monomers) that include a mesogenic group. Mesogenic groups are generally rigid rodlike or disclike molecules or portions of a molecule that are components of liquid crystals. Examples of mesogenic groups include, but are not limited to, para-substituted cyclic groups, such as para-substituted benzene rings. These mesogenic groups are optionally bonded to a polymer backbone through a spacer. The spacer can contain functional groups having, for example, benzene, pyridine, pyrimidine, alkyne, ester, alkylene, alkane, ether, thioether, thioester, and amide functionalities.

Suitable cholesteric liquid crystal polymers include, but are not limited to, polymers having a chiral or achiral polyester, polycarbonate, polyamide, polyacrylate, polymethacrylate, polysiloxane, or polyesterimide backbone that include mesogenic groups optionally separated by rigid or flexible comonomers. Examples of other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups can be optionally separated from the backbone by a spacer, such as an alkylene or alkylene oxide spacer, to provide flexibility.

Small molecules may be added to liquid crystal polymers or be incorporated into the liquid crystal polymer as a copolymer. These small molecules can improve the optical clarity of cholesteric systems and simultaneously produce better alignment uniformity and thus reflective efficiency. This combination leads to improved contrast ratio of the selective reflection. These improvements are produced with polymerizable small molecules added to the cholesteric liquid crystal composition defined by compounds of formula I, formula II, formula III, or formula IV described below; or small molecules copolymerized with cholesteric precursors or polymers defined by compounds of formula I, formula II, or formula III described below.

In one embodiment of the invention, a suitable cholesteric liquid crystal composition in accordance with the invention includes a) a cholesteric liquid crystal compound or cholesteric liquid crystal precursors and b) a compound of formula I, formula II or formula III:

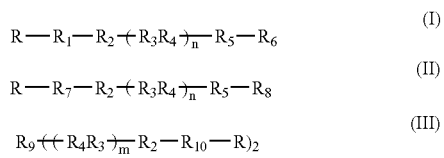

where n is 1, 2, 3, or 4 and m is 1, 2, or 3. R is an acrylate, methacrylate, acrylamide, isocyanate, epoxy, or silane. $R_1$ is $(C_3-C_8)$ alkylene, $(C_3-C_8)$ alkenylene, or $(C_3-C_8)$ alkylyne. $R_2$ is a bond, —O—, —C(O)O—, —O(O)C—, —OC(O)O—, —C(O)N—, —CH=N—, —N=CH—, or —NC(O)—. $R_3$ is a cycloalkylene, cycloalkenylene, heterocyclylene, arylene, or hetroarylene. $R_4$ is a bond, $(C_1-C_8)$ alkylene, $(C_2-C_8)$ alkenylene, $(C_2-C_8)$ alkylyne, carbonyl, —O—, —C(O)O—, —O(O)C—, or —OC(O)O—, —C(O)N—, —CH=N—, —N=CH—, or —NC(O)—. $R_5$ is a bond, cycloalkylene, cycloalkenylene, hetrocyclylene, arylene, or hetroarylene. $R_6$ is hydrogen, cyano, halo, $(C_1–C_8)$ alkoxy, $(C_1–C_8)$ alkyl, nitro, amino, carboxy, mercapto, $(C_{1-4})$thioalkyl, $COCH_3$, $CF_3$, $OCF_3$, or $SCF_3$. $R_7$ is a $(C_{1-2})$ alkylene, $(C_2)$ alkenylene, or $(C_2)$ alkylyne. $R_8$ is hydrogen, halo, $(C_1–C_8)$ alkoxy, $(C_1–C_8)$ alkyl, nitro, amino, carboxy, mercapto, $(C_1–C_4)$thioalkyl, $COCH_3$, $CF_3$, $OCF_3$, or $SCF_3$. $R_9$ is a cycloalkylene, cycloalkenylene, heterocyclylene, arylene, or hetroarylene. $R_{10}$ is a $(C_1–C_8)$ alkylene, $(C_2–C_8)$ alkenylene, or $(C_2–C_8)$ alkylyne.

In one embodiment of Formula I, n is 1 or 2, R is acrylate, $R_1$ is $(C_3–C_6)$ alkylene, $R_2$ is —O—, $R_3$ is phenylene, $R_4$ is —C(O)O—, or —O(O)C—, $R_5$ is a bond or phenylene and $R_6$ is F or cyano.

In one embodiment of Formula II, n is 1 or 2, R is acrylate, $R_7$ is $(C_1–C_2)$ alkylene, $R_2$ is —O—, $R_3$ is phenylene, $R_4$ is —C(O)O—, or —O(O)C—, $R_5$ is a bond or phenylene and $R_8$ is F, $CF_3$, methoxy, or butoxy.

In one embodiment of Formula III, m is 1 or 2, $R_9$ is phenylene, $R_4$ is —C(O)O—, or —O(O)C—, $R_3$ is a phenylene, $R_2$ is a —O—, $R_{10}$ is a $(C_3–C_6)$ alkylene, and R is an acrylate.

Examples of some suitable compounds of formula I, formula II, or formula III are:

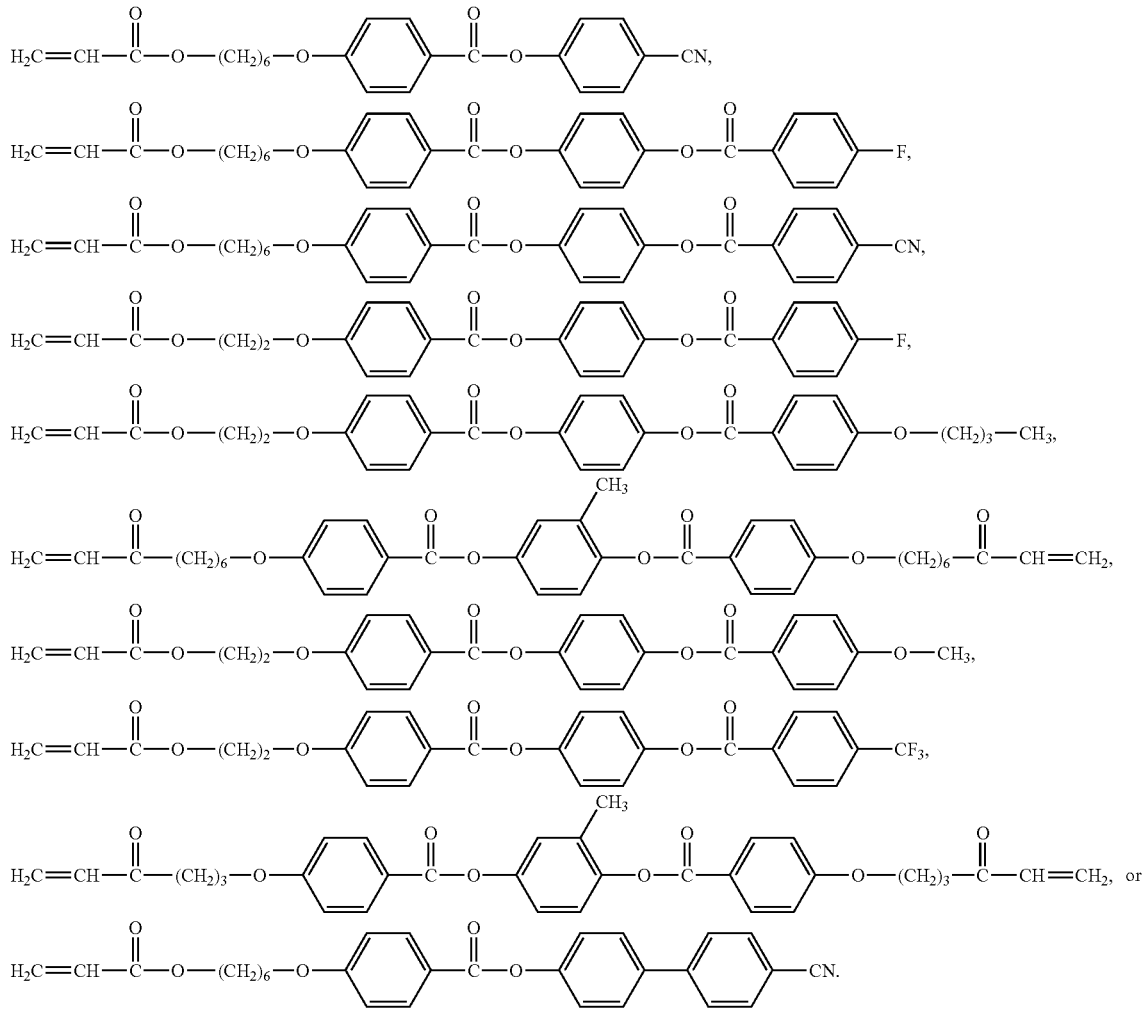

In another embodiment of the invention, a suitable cholesteric liquid crystal film in accordance with the invention includes a cholesteric liquid crystal polymer and a compound of formula IV:

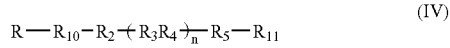

(IV)

where n is 1, 2, 3, or 4. R is an acrylate, methacrylate, acrylamide, isocyanate, epoxy, or silane. $R_{10}$ is $(C_1–C_8)$ alkylene, $(C_1–C_8)$ alkenylene, or $(C_1–C_8)$ alkylyne. $R_2$ is a bond, —O—, —C(O)O—, —O(O)C—, —OC(O)O—, —C(O)N—, —CH=N—, —N=CH—, or —NC(O)—. $R_3$ is a cycloalkylene, cycloalkenylene, heterocyclylene, arylene, or hetroarylene. $R_4$ is a bond, $(C_1–C_8)$ alkylene, $(C_2–C_8)$ alkenylene, $(C_2–C_8)$ alkylyne, carbonyl, —O—, —C(O)O—, —O(O)C—, —OC(O)O—, —C(O)N—, —CH=N—, —N=CH—, or —NC(O)—. $R_5$ is a bond, cycloalkylene, cycloalkenylene, hetrocyclylene, arylene, or hetroarylene. $R_{11}$ is hydrogen, cyano, halo, ($C_1$–$C_8$) alkoxy, ($C_1$–$C_8$) alkyl, nitro, amino, carboxy, mercapto, ($C_1$–$C_4$) thioalkyl, $COCH_3$, $CF_3$, $OCF_3$, or $SCF_3$.

In one embodiment of Formula IV, n is 1 or 2, R is acrylate, $R_{10}$ is ($C_2$–$C_6$) alkylene, $R_2$ is —O—, $R_3$ is phenylene, $R_4$ is —C(O)O—, or —O(O)C—, $R_5$ is a bond or phenylene and $R_{11}$ is F, cyano, $CF_3$, methoxy, or butoxy.

One example of a suitable compound of formula IV is:

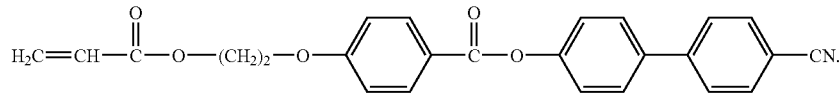

The cholesteric liquid crystal polymer typically includes a chiral molecular unit and an achiral molecular unit as described above. The chiral molecular unit and the achiral molecular unit can be different than the compound of formula I, formula II or formula III. The achiral molecular unit can be, for example, a compound of formula C2 described above.

In one embodiment of the invention, cholesteric liquid crystal compositions generally have from about 1 to 35%, 5 to 20%, or 10 to 15% of one or more compounds of formula I, formula II, formula III or formula IV by weight of the total solids content of the composition. In another embodiment, the cholesteric liquid crystal composition has from about 10 to 20% of one or more compounds of formula I, formula II, formula III, or formula IV by weight of the total solids content of the composition.

In some embodiments, the ratio, by weight, of the compounds of formula I, formula II, formula III, or formula IV to the cholesteric liquid crystal compound (including cholesteric liquid crystal polymer) or cholesteric liquid crystal precursor is in the range of 1:99 to 1:3. In some embodiments, the ratio, by weight, of the compounds of formula I, formula II, formula III, or formula IV to the cholesteric liquid crystal compound (including cholesteric liquid crystal polymer) or cholesteric liquid crystal precursor is in the range of 1:10 to 1:5.

The addition of compounds of formula I, formula II, formula III, or formula IV to cholesteric liquid crystal compositions of the invention is thought to aid in the alignment of the cholesteric liquid crystal precursors or compounds during the formation of an aligned liquid crystal layer. Because compounds of formula I, formula II, formula III, or formula IV may serve to impart this characteristic to cholesteric liquid crystal compositions of the invention, they are often referred to as "compatible". One indication of compatibility is that at least one cholesteric liquid crystal layer is more uniformly aligned when the compound of formula I, formula II, formula III, or formula IV are added to cholesteric liquid crystal compounds or precursors or when the compounds of formula I, formula II, or formula III are incorporated into the liquid crystal polymer as a copolymer. For example, compatibility can be observed by measuring the transmission of a dried film of the cholesteric liquid crystal composition with the compound of formula I, formula II, formula III, or formula IV as compared to a similar composition without the compound of formula I, formula II, formula III, or formula IV.

In another embodiment, the measured transmission over a desired wavelength range or at a particular wavelength for a film made using the inventive cholesteric liquid crystal composition is higher than that of a film formed using the same cholesteric liquid crystal composition without the compound of formula I, formula II, formula III, or formula IV.

The spectrum of the coated film can be measured, for example, with a Lambda 900 spectrophotometer (Perkin Elmer, Santa Clara, Calif.) with a Glan-Thomas polarizer and a ¼ wave film in the optical path. The ¼ wave axis is maintained at 45° to the polarizer axis. First the polarizer and then the ¼ wave plate is placed in the light path and the instrument is zeroed. The sample is then placed in the light path after the ¼ wave plate and facing the ¼ wave pate. The spectrum is recorded from 350 nm to 800 nm to cover the visible light spectrum. Incompatible coatings can produce haze which scatters light and reduces the % pass transmission below, for example 65%.

The % pass transmission (% $T_{pass}$) of the cholesteric liquid crystal film that is formed from a cholesteric liquid crystal composition of the invention can be an indication of some of the properties of the cholesteric liquid crystal film that may ultimately be obtained from a cholesteric liquid crystal composition of the invention, such as transparency of the cholesteric liquid crystal film. The % pass transmission corresponds to the level of transmission of the film for the polarization that should be passed by the film. In one embodiment, the % pass transmission of a cholesteric liquid crystal film formed from a cholesteric liquid crystal composition of the invention is greater over a particular wavelength range or at a particular wavelength than that of a cholesteric liquid crystal film formed from a cholesteric liquid crystal composition without the compound of formula I, formula II, formula III, or formula IV. In another embodiment, the % pass transmission is at least about 65%, 75%, 85% or 90%. Greater values of % pass transmission are generally preferred. In another embodiment, the % pass transmission is 1–50%, 5–40%, 10–30% or at least 30% greater than a similar composition or film without the compound of formula I, formula II, formula III, or formula IV. As an example, the numerical value used for the % $T_{pass}$ can be determined at the same wavelength as the minimum % transmission (described below).

The minimum % transmission or extinction (% $T_{min}$) of the cholesteric liquid crystal film that is formed from a cholesteric liquid crystal composition of the invention can be an indication of some of the properties of the cholesteric liquid crystal film that may ultimately be obtained from a cholesteric liquid crystal composition of the invention, such as alignment quality of the cholesteric liquid crystal film. The wavelength at the minimum % transmission or extinction corresponds to the wavelength at the maximum reflection of the film. Extinction can be measured in a manner similar to transmission but with the polarizer rotated 90 degrees from the position used in the transmission measurement described above. In one embodiment, the extinction of a cholesteric liquid crystal film formed from a cholesteric liquid crystal composition of the invention is of lower value than that of a cholesteric liquid crystal film formed from a cholesteric liquid crystal composition without the compound of formula I, formula II, formula III, or formula IV. In another embodiment, the extinction is not greater than about 5%, 10%, 12%, or 15%. In another embodiment, the extinction value is at least 1%, 2%, 3%, 4% or 5% less than the extinction value of a similar liquid crystal composition or film without the compound of formula I, formula II, formula III, or formula IV.

The maximum contrast ration (CR) of the cholestric liquid crystal film that is formed from a cholesteric liquid crystal composition of the invention can be an indication of some of the properties of the cholesteric liquid crystal film that may ultimately be obtained from a cholesteric liquid crystal composition of the invention, such as optical quality of the cholesteric liquid crystal film. Maximum contrast ratio (CR) can be determined by dividing the % $T_{pass}$ by % $T_{min}$. In one embodiment, the maximum contrast ratio (CR) of a cholesteric liquid crystal film formed from a cholesteric liquid crystal composition of the invention is greater than that of a cholesteric liquid crystal film formed from a cholesteric liquid crystal composition without the compound of formula I, formula II, formula III, or formula IV. In another embodiment, the maximum contrast ratio (CR) is at least about 6, 10, 12, 15, or 16. In another embodiment, the maximum contrast ratio (CR) is at least 5%, 10%, 25%, 50%, 100%, 150%, 200% or 300% greater than the maximum contrast ratio of a similar liquid crystal composition or film without the compound of formula I, formula II, formula III, or formula IV. In another embodiment, the maximum contrast ratio (CR) is 5 to 300%, 10 to 200%, or 25 to 100% greater than the maximum contrast ration of a similar liquid crystal composition or film without the compound of formula I, formula II, formula III, or formula IV.

One example of a method for carrying out an extinction test method includes the following procedure. The compound of formula I, formula II, formula III, or formula IV is mixed with the cholesteric liquid crystal polymer in a suitable solvent. An exemplary composition for this mixture includes 13% cholesteric liquid crystal polymer, 2.3% of compounds of formula I, formula II, formula III, or formula IV, and 84.7% solvent. The solution, containing the compound of formula I, formula II, formula III, or formula IV and the cholesteric liquid crystal polymer, is coated on a clear plastic film with an alignment surface. For example, a polyethylene terephthalate (PET) oriented film which offers a natural liquid crystal alignment surface is commercially available from 3M (SCOTCHPAR® type 718386, St. Paul, Minn.) or DuPont (Wilmington, Del.). The coating is dried and annealed at a temperature such that the cholesteric liquid crystal precursor is in its nematic phase. The solution is typically coated in an amount to give a dried thickness of about 4 micrometers, or several pitch lengths.

Cholesteric liquid crystal compositions in accordance with the invention can also include a solvent. In some instances, one or more of the cholesteric liquid crystal precursors or other components of the cholesteric liquid crystal composition can act as a solvent. The one or more solvents, or other compounds that function as a solvent are generally substantially eliminated from the cholesteric liquid crystal composition during processing. They can be eliminated by, for example, drying the composition to evaporate the solvent or reacting a portion of the solvent (e.g., reacting a solvating liquid crystal precursor to form a liquid crystal polymer). Any solvents known to those of skill in the art as being able to solubilize the components of the composition can be used, specific examples include, but are not limited to, tetrahydrofuran, cyclohexanone, cyclopropanone, methyl ethyl ketone and 1,3-dioxolane. Combinations of solvents can also be utilized in compositions of the invention.

Cholesteric liquid crystal compositions in accordance with the invention can also include polymerization initiators that function to initiate polymerization or crosslinking of monomeric or other lower molecular weight compounds of the composition. Suitable polymerization initiators include compounds that can generate free radicals to initiate and propagate polymerization or crosslinking. Free radical initiators can be chosen based on a number of factors, including but not limited to, stability and half life. Preferably, the free radical initiator does not generate any additional color in the cholesteric liquid crystal layer by absorption or otherwise.

Compounds of formula I, formula II, formula III or formula IV can be added to a cholesteric liquid crystal polymer in a sufficient amount such that the compounds of formula I, formula II, formula III or formula IV can be cured or cross-linked following the formation of the cholesteric liquid crystal layer or alignment of the cholesteric liquid crystal layer, to form a cross-linked cholesteric liquid crystal film. Compounds of formula I, formula II, formula III or formula IV can be added to a cholesteric liquid crystal polymer in a sufficient amount such that the compounds of formula I, formula II, formula III or formula IV can be cured or cross-linked with an additional layer disposed on the cholesteric liquid crystal layer following the formation of the cholesteric liquid crystal layer or alignment of the cholesteric liquid crystal layer, to form a cholesteric liquid crystal film crosslinked or chemically linked to an additional layer disposed thereon.

Free radical initiators are typically either thermal free radical initiators or photoinitiators. Thermal free radical initiators, which generate free radicals upon thermal decomposition, include, for example, peroxides, persulfates, or azonitrile compounds. Photoinitiators can be activated by electromagnetic radiation or particle irradiation. Examples of suitable photoinitiators include, but are not limited to, onium salt photoinitiators, organometallic photoinitiators, cationic metal salt photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources or irradiation (e-beam) can be used. Photoinitiators can be chosen based on the absorption of particular wavelength of light.

Cholesteric liquid crystal compositions in accordance with the invention may also additionally contain compounds that function as dispersing agents, terminators, curing agents, crosslinkers, antiozonants, antioxidants, plasticizers, stabilizers, viscosity modifiers, such as thickeners and fillers, coalescing agents which function to improve the intimacy of the contact between particles after deposition onto the substrate, and dyes and pigments for absorbing ultraviolet, infrared, or visible light.

Any method known to those of skill in the art for forming a cholesteric liquid crystal composition of the invention into a cholesteric liquid crystal layer can be utilized. Furthermore, improvements in and changes to existing methods of forming cholesteric liquid crystal layers can also be utilized to form cholesteric liquid crystal layers from cholesteric liquid crystal compositions of the invention. The methods discussed below offer examples of methods and techniques that may be utilized to form cholesteric liquid crystal layers in accordance with the invention, and are not meant to limit the invention in any way.

One method of forming a cholesteric liquid crystal layer includes applying a cholesteric liquid crystal composition to a surface of a substrate. The cholesteric liquid crystal composition can be applied to the surface in a number of ways, including, but not limited to coating and spraying. Alternatively, the surface of the substrate can be oriented prior to being coated with the cholesteric liquid crystal layer. The substrate can be oriented using, for example, drawing techniques, rubbing with a rayon or other cloth, or lyotropic alignment (U.S. Pat. No. 6,395,354, incorporated herein by reference). Photoalignment substrates are described in U.S.

Pat. Nos. 4,974,941, 5,032,009, 5,389,698, 5,602,661, 5,838,407, and 5,958,293, all of which are incorporated herein by reference.

After coating, the cholesteric liquid crystal composition is converted into a liquid crystal layer. Generally, this process includes drying the composition and annealing the dried composition, alternatively, these processes can occur somewhat simultaneously. The formation of a cholesteric liquid crystal layer can be accomplished by a variety of techniques including evaporation of solvent that is present; crosslinking the cholesteric liquid crystal composition; annealing or curing (e.g., polymerizing) the cholesteric liquid crystal composition using, for example, heat, radiation (e.g., actinic radiation), light (e.g., ultraviolet, visible, or infrared light), an electron beam, or a combination of these or similar techniques.

One example of a process of forming a liquid crystal layer includes depositing the cholesteric liquid crystal composition on an oriented substrate. After deposition, the cholesteric liquid crystal composition is heated above the glass transition temperature of the composition and onto the liquid crystal phase. The composition is then cooled below the glass transition temperature and the composition remains in the liquid crystal phase.

Another process for forming a liquid crystal layer includes depositing the cholesteric liquid crystal composition on a substrate, and aligning the oligomeric liquid crystal by drying the composition to remove the solvent. Cholesteric liquid crystal compositions of the invention can be dried by any method known to those of skill in the art including those that restrict air flow. Examples of methods or apparatuses that restrict airflow can be found in U.S. Pat. Nos. 5,581,905; 5,694,701; 6,134,808, and U.S. Ser. No. 10/373,127 all of which are incorporated herein by reference.

Cholesteric liquid crystal compositions can be formed into a layer that substantially reflects light having one polarization (e.g., left or right circularly polarized light) and substantially transmits light having the other polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

The cholesteric liquid crystal layer can be used alone or in combination with other cholesteric liquid crystal layers or other types of layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multilayer reflective polarizers. Pitch and optical layer thickness determine the center wavelength of the cholesteric liquid crystal polarizers and multilayer reflective polarizers, respectively. The rotating director of the cholesteric liquid crystal polarizer forms optical repeat units similar to the use of multiple layers having the same optical layer thickness in multilayer reflective polarizers.

The center wavelength, $\lambda_0$, and the spectral bandwidth, $\Delta\lambda$, of the light reflected by the cholesteric liquid crystal layer depend on the pitch, p, of the cholesteric liquid crystal.

The center wavelength, $\lambda_0$, is approximated by:

$$\lambda_0 = 0.5(n_o + n_e)p$$

where no and ne are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

Cholesteric liquid crystal polarizers can be formed by laminating or otherwise stacking two already-formed cholesteric liquid crystal layers, each disposed on an individual substrate, with different pitches (e.g., layers having different compositions, for example, different ratios by weight of chiral and nematic liquid crystal compounds or monomers). These two layers are heated to diffuse liquid crystal material between the layers. The diffusion of material between the two layers typically results in the pitch of the layers varying over a range between the individual pitches of the two layers. Other methods of forming cholesteric liquid crystal polarizers are described in, for example, U.S. patent application Ser. Nos. 09/790,832; 09/791,157; and 09/957,724, all of which are incorporated herein by reference.

The cholesteric liquid crystal optical bodies can be used in a variety of optical displays and other applications, including transmissive (e.g., backlit), reflective, and transflective displays. For example, FIG. 1 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) that transmits only light of one polarization state.

The backlight 404 that supplies the light used to view the display system 400 includes, for example, a light source 416 and a light guide 418, although other backlighting systems can be used. Although the light guide 418 depicted in FIG. 1 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 2:
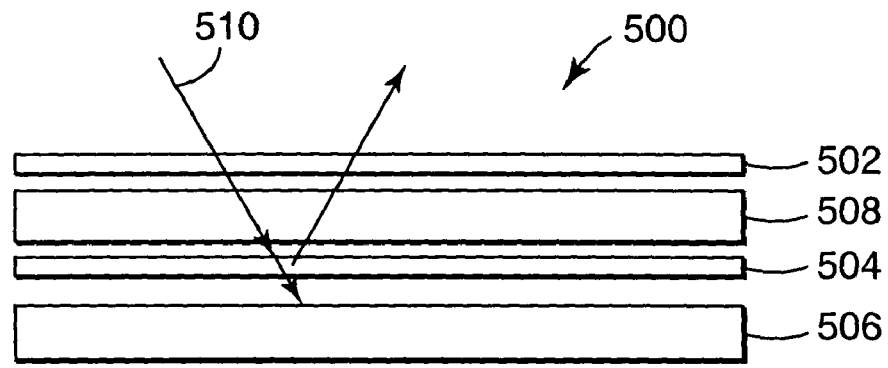
FIG. 2 is a schematic illustration of another embodiment of a liquid crystal display in accordance with the invention.

FIG. 2 is a schematic illustration of one type of reflective liquid crystal display 500. This reflective liquid crystal display 500 includes a display medium 508, a cholesteric liquid crystal reflective polarizing mirror 504, an absorptive backing 506, and an absorptive polarizer 502. The liquid crystal display 500 optionally includes a wave plate as part of the cholesteric liquid crystal reflective polarizer 504 or as a separate component to convert mixed polarization light from the liquid crystal device to an appropriately polarized light.

Liquid crystal display 500 functions first by the absorptive polarizer 502 polarizing light 510. The polarized light then travels through the display medium 508 where one of the light's circular polarization components reflects from the cholesteric liquid crystal reflective polarizing mirror 504 and passes back through the display medium 508 and absorptive polarizer 502. The other circular polarization component passes through the cholesteric liquid crystal reflective polarizer 504 and is absorbed by the backing 506. The reflective polarizer 504 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

Figure 3:
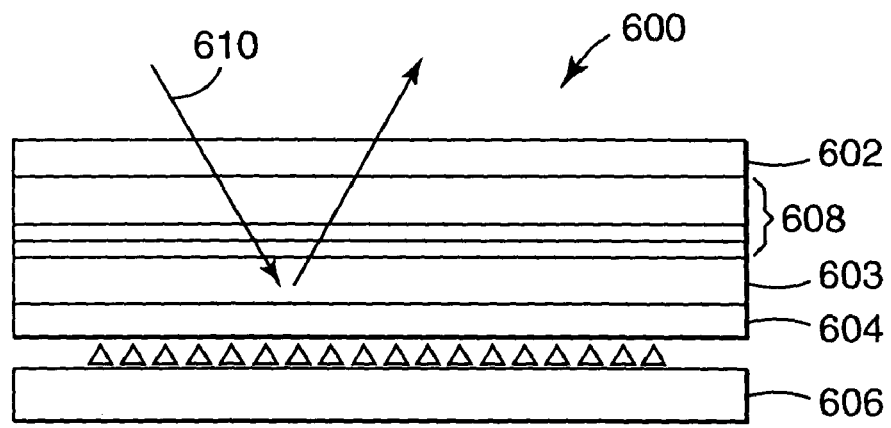
FIG. 3 is a schematic illustration of yet another embodiment of a liquid crystal display in accordance with the invention.

FIG. 3 is a schematic illustration of one type of transflective liquid crystal display 600. This transflective liquid crystal display 600 includes a phase retarding display medium 608, a partial mirror 603, a cholesteric liquid crystal reflective polarizing mirror 604, a backlight 606, and an absorptive polarizer 602. The display system optionally includes a wave plate as part of the cholesteric liquid crystal reflective polarizer 604 or as a separate component to convert mixed polarization light from the liquid crystal device to an appropriately polarized light. In the reflective mode, bright ambient light 610 is polarized by the absorptive polarizer 602, travels through the display medium 608, reflects off the partial mirror 603, and passes back through the display medium 608 and absorptive polarizer 602. In low ambient-light situations, the backlight 606 is activated and light is selectively passed through the cholesteric polarizer 604, matched to provide appropriately polarized light to the display. Light of the opposite handedness is back-reflected, recycled, and selectively passed through the cholesteric polarizer 604 to effectively increase backlight brightness. The reflective polarizer of this reflective liquid crystal display 600 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarterwave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLES

All chemicals for the following examples can be obtained from Aldrich, Inc. of Milwaukee, Wis. unless indicated otherwise.

Example 1

Synthesis of Various Compounds

A reaction scheme for forming various compounds disclosed herein can be described as:

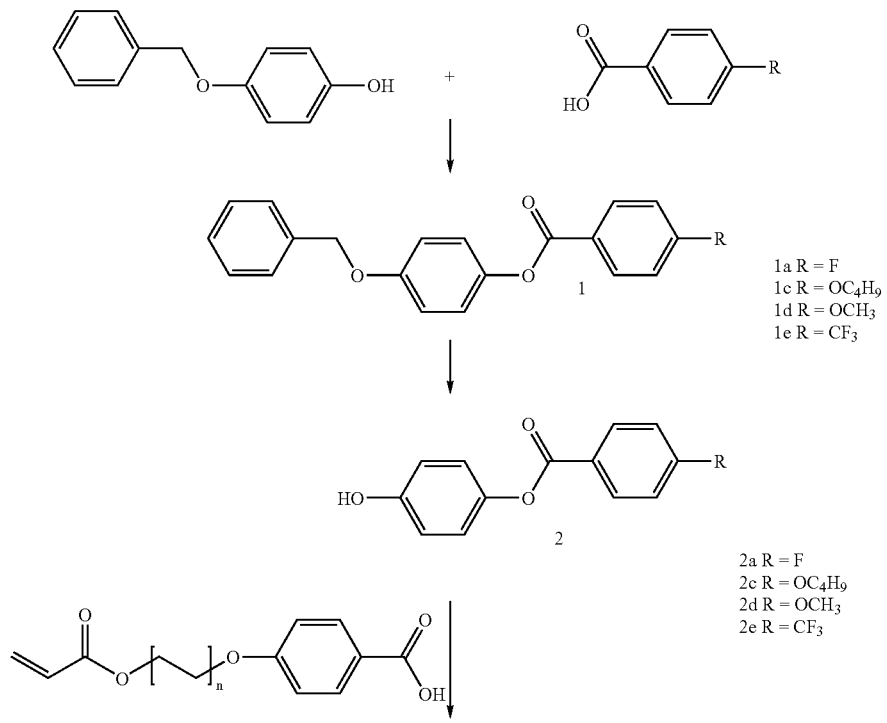

-continued

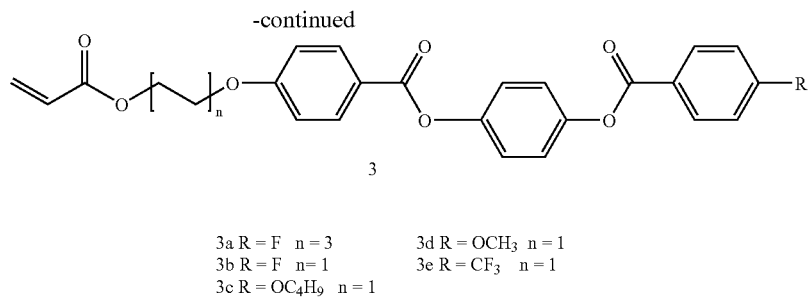

3

3a R = F   n = 3   3d R = OCH$_3$   n = 1
3b R = F   n = 1   3e R = CF$_3$   n = 1
3c R = OC$_4$H$_9$   n = 1

Preparation of 4-[(4-fluorobenzoyl)oxy]phenyl 4-{[6-(acryloyloxy)hexyl]oxy}benzoate (3 a):

A reaction flask was charged with 36.8 g (0.257 moles) of 4-fluorobenzoic acid, 53.21 g (0.526 moles) of triethylamine and 284 g of ethylene glygol dimethyl ether. The solution was cooled to −30° C., and 30.12 g (0.263 moles) of methane sulfonyl chloride was added. After maintaining stirring at −30° C. for one additional hour, 52.60 g (0.263 moles) of 4-(benzyloxy)phenol and 3.2 g (0.026 moles) of 4-(dimethylamino)pyridine were added. The resulting mixture was then warmed to room temperature, and then to 50° C. for three hours. Finally, the mixture was cooled to room temperature and diluted with 1 liter of water. The crude 1a was collected by filtration and washed with water. Intermediate 1a was purified by recrystallization from 1.5 liters of acetonitrile, to yield a white solid.

30 grams of 1a was dissolved in 440 ml of THF and hydrogenated in the presence of 1 gram of 10% palladium on carbon at room temperature and 60 psi hydrogen pressure overnight. The catalyst was removed by filtration, and the solvent was stripped on a rotary evaporator to yield pure 2a.

A reaction flask was charged with 11.08 g (0.038 moles) of 4-{[6-(acryloyloxy)hexyl]oxy}benzoic acid, 7.67 g (0.076 moles) of triethylamine and 110 g of ethylene glycol dimethyl ether. The solution was cooled to −30° C., and 4.34 g (0.038 moles) of methane sulfonyl chloride was added. After maintaining stirring at −30° C. for one additional hour, added 8.80 g (0.038 moles) of intermediate 2a and 0.46 g (0.004 moles) of 4-(dimethylamino)pyridine. The resulting mixture was then warmed to room temperature, and then to 50° C. for three hours. Finally, the mixture was cooled to room temperature and diluted with 300 ml of water. The crude product was collected by filtration and washed with water. The product 3a was purified by recrystallization from acetonitrile Preparation of 4-[(4-fluorobenzoyl)oxy]phenyl 4-[2-(acryloyloxy)ethoxy]benzoate (3b):

3b was prepared by the same procedure as 3a except that 4-[2-(acryloyloxy)ethoxy}benzoic acid was used instead of 4-{[6-(acryloyloxy)hexyl]oxy}benzoic acid.

Preparation of 4-[(4-butoxybenzoyl)oxy]phenyl 4-[2-(acryloyloxy)ethoxy]benzoate (3c):

3c was prepared by the same procedure as 3b except that 4-butoxybenzoic acid was used instead of 4-fluorobenzoic acid.

Preparation of 4-[(4-methoxybenzoyl)oxy]phenyl 4-[2-(acryloyloxy)ethoxy]benzoate (3d):

3d was prepared by the same procedure as 3b except that 4-methoxybenzoic acid was used instead of 4-fluorobenzoic acid.

Preparation of 4-[(4-trifluoromenthylbenzoyl)oxy]phenyl 4-[2-(acryloyloxy)ethoxy]benzoate (3c ):

3e was prepared by the same procedure as 3b except that 4-trifluoromethylbenzoic acid was used instead of 4-fluorobenzoic acid.

Preparation of 4-[(4-cyanobenzoyl)oxy]phenyl 4-{[6-(acryloyloxy)hexyl]oxy}benzoate (7):

A mixture of tert-butyldimethylsilyl chloride (80 g, 0.531 moles), 4-(benzyloxy)phenol (106.28 g, 0.531 moles), imidizole (90.33 g, 1.327 moles) in 508 ml of N,N-dimethylformamide was stirred at room temperature for 2 days. Then the mixture was cooled with an ice bath and slowly added 400 ml of water. The resulting solid was collected via filtration, washed with water, and then recystallized from 532 ml of acetonitrile. The resulting intermediate 4 was in the form of large clear crystals. Next, 35 g of 4 was hydrogenated in tetrahydrofuran in the presence of 10% palladium on carbon at 60 psi hydrogen pressure at room temperature to yield intermediate 5.

A reaction flask was charged with 9.03 g (0.061 moles) of 4-cyanobenzoic acid, 12.43 g (0.123 moles) of triethylamine and 105.68 g of ethylene glygol dimethyl ether. The solution was cooled to −30° C., and 7.04 g (0.061 moles) of methane sulfonyl chloride was added. After maintaining stirring at −30° C. for one additional hour, 15 g (0.061 moles) of 5 and 0.75 g (0.006 moles) of 4-(dimethylamino)pyridine were added. The resulting mixture was then warmed to room temperature, and then to 50° C. for three hours. Finally, the mixture was cooled to room temperature and diluted with 298 ml of water. The resulting solid was collected by filtration and washed with water, and then recrystallized from acetonitrile, to yield a white solid. The white solid (10 g, 0.028 moles) was then stirred for 1.5 hours in N,N-dimethylformamide with tetrabutylammonium fluoride (7.76 g, 0.029 moles), followed by vacuum stripping of all volatile materials to yield crude 6, which was then purified by column chromatography (silica gel, eluting with 10% methanol in chloroform).

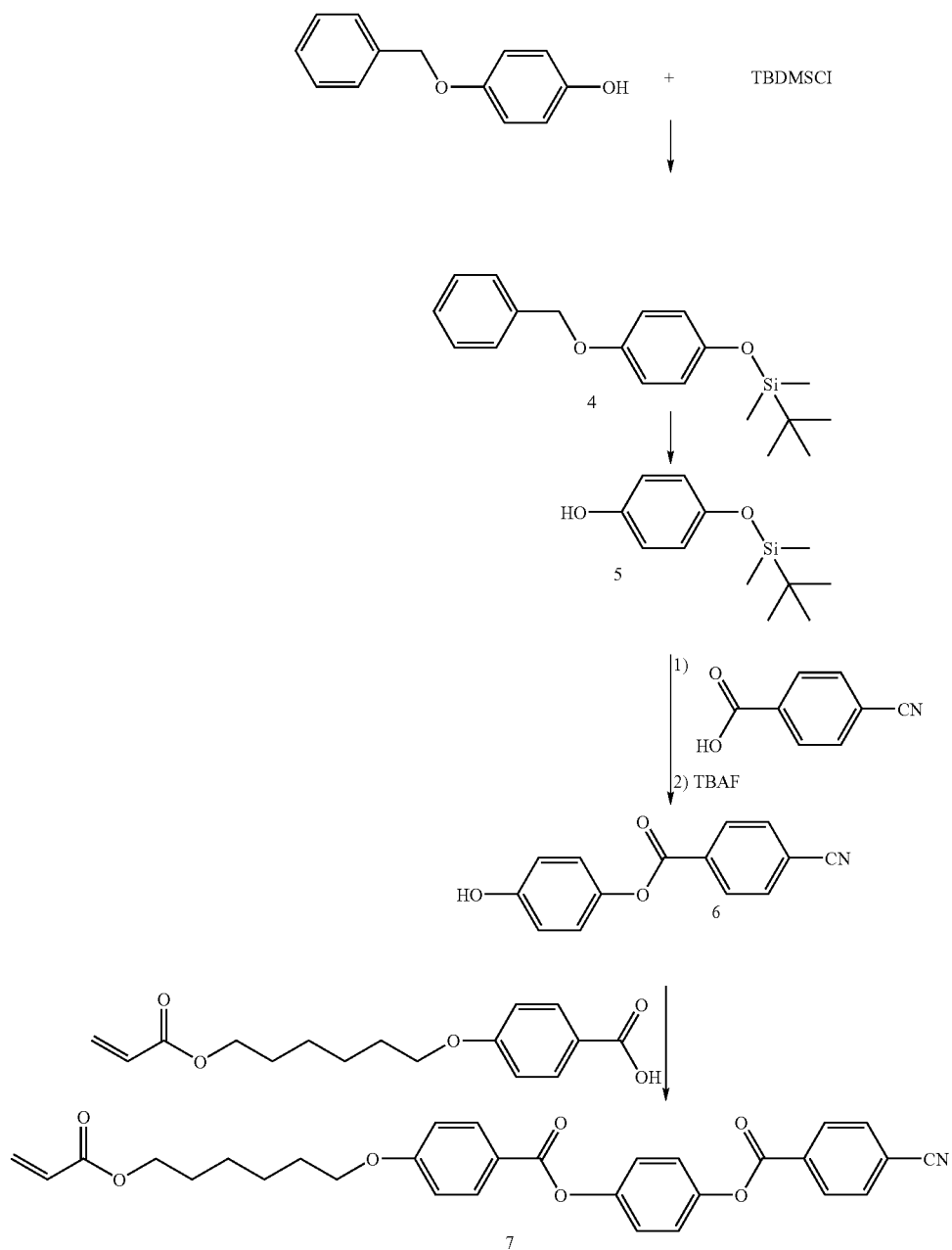

A reaction flask was charged with 11.08 g (0.038 moles) of 4-{[6-(acryloyloxy)hexyl]oxy}benzoic acid, 7.67 g (0.076 moles) of triethylamine and 110 g of ethylene glycol dimethyl ether. The solution was cooled to −30° C., and 4.34 g (0.038 moles) of methane sulfonyl chloride was added. After maintaining stirring at −30° C. for one additional hour, 9.09 g (0.038 moles) of intermediate 6 and 0.46 g (0.004 moles) of 4-(dimethylamino)pyridine were added. The resulting mixture was then warmed to room temperature, and then to 50° C. for three hours. Finally, the mixture was cooled to room temperature and diluted with 300 ml of water. The crude product was collected by filtration and washed with water. The product, 7, was purified by recrystallization from ethanol.

Example 2

Effect of Various Compounds 4-(2-Acryloyloxy-ethoxy)-benzoic acid 4'-cyano-biphenyl-4-yl ester (also known as cyano biphenyl benzoate ethyl acrylate or C2) can be prepared as described in European Patent Application Publication No. 834757, incorporated herein by reference, and is a nematic liquid crystal monomer having the structure:

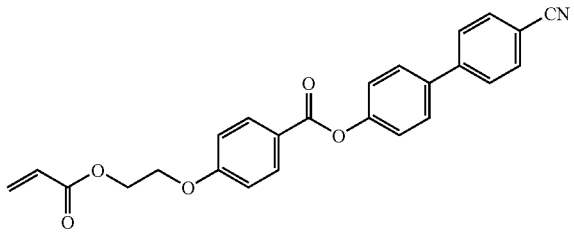

were mixed until clear, at a temperature of 60° C. The mixed solutions were then coated on to 100 micron thick PET film (SCOTCHPAR™, 3M, St. Paul, Minn.). The coated film was baked at about 120° C. for about 12 minutes. The spectrum of each coated film was then measured by using a Lambda 900 spectrophotometer (Perkin Elmer, Santa Clara, Calif.) with a Glan-Thomas polarizer and Newport zero order achromatic ¼ wave film in the optical path. The polarizer and quarter wave plate were oriented to give the minimum % transmission (extinction) of the spectra (% $T_{min}$). At the wavelength that produced the % $T_{min}$ value, the % transmission of pass of the spectra was measured (% $T_{pass}$) by rotating the polarizer 90°. The maximum contrast ratio (CR) is provided by dividing the % $T_{pass}$ by % $T_{min}$. The values observed are given in Table 1 below.

TABLE 1

| Additive | % $T_{min}$ | % $T_{pass}$ | CR |
|---|---|---|---|
| Control (no added small molecule) | 12 | 66.8 | 5.5 |
| H₂C=CH—C(O)—O—(CH₂)₂—O—C₆H₄—C(O)—O—C₆H₄—C₆H₄—CN | 9.5 | 90 | 9.4 |
| H₂C=CH—C(O)—O—(CH₂)₆—O—C₆H₄—C(O)—O—C₆H₄—C₆H₄—CN | 11 | 88 | 7.9 |
| H₂C=CH—C(O)—O—(CH₂)₆—O—C₆H₄—C(O)—O—C₆H₄—O—C(O)—C₆H₄—F | 13 | 83 | 6.4 |
| H₂C=CH—C(O)—O—(CH₂)₆—O—C₆H₄—C(O)—O—C₆H₄—O—C(O)—C₆H₄—CN | 8.8 | 88 | 10 |
| H₂C=CH—C(O)—O—(CH₂)₂—O—C₆H₄—C(O)—O—C₆H₄—O—C(O)—C₆H₄—F | 6.7 | 90 | 13 |
| H₂C=CH—C(O)—O—(CH₂)₂—O—C₆H₄—C(O)—O—C₆H₄—O—C(O)—C₆H₄—O—(CH₂)₃—CH₃ | 9.8 | 90 | 9.1 |
| H₂C=CH—C(O)—(CH₂)₆—O—C₆H₄—C(O)—O—C₆H₃(CH₃)—O—C(O)—C₆H₄—O—(CH₂)₆—C(O)—CH=CH₂ | 13 | 87 | 6.8 |

Additive 12 wt % cyano biphenyl benzoate ethyl acrylate, 1 wt % Paliocolor LC756 (BASF, Charlotte, N.C.), 0.2 wt % Paliocolor LC242 (BASF, Charlotte, N.C.), 45 wt % Dioxolane, 37 wt % cyclohexanone, 2 wt % carbon tetrabromide, and 0.3% Vazo 52 (DuPont, Wilmington, Del.) were combined and heated at about 60° C. for about 14 hours under nitrogen to form a polymer solution.

After 14 hours, the compounds of formula I, formula II, formula III or formula IV (in the amounts indicated in Table 1) were added to the polymer solution. The additives were added in an amount 15.5% of the weight of the initial solids, typically with additional solvent. The resulting solutions As can be seen from Table 1, while all of the additives that were utilized were compatible with the liquid crystal polymer (they all had pass transmission of >65%) the cholesteric liquid crystal films formed thereby had varying results for extinction. Pass transmissions in excess of 80% provide excellent transparency of the film. They all produced cholesteric liquid crystal layers with a similar or better (lower) extinction, versus the composition without any additive (control). Extinction values below 10% transmission indicate excellent alignment quality. In addition, all of the additives tested produced cholesteric liquid crystal films with enhanced maximum contrast ratios verses the control.

Figure 4:
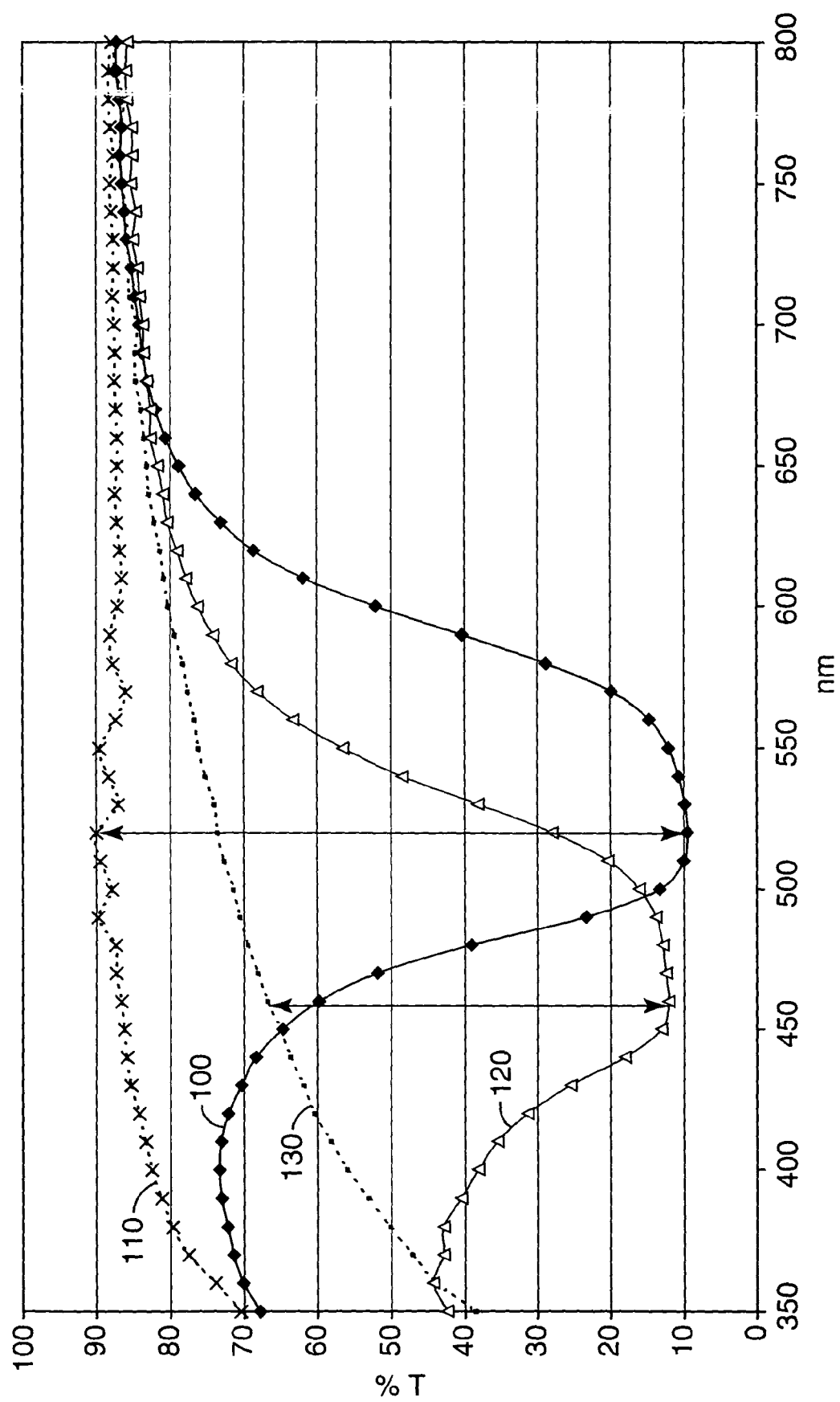
FIG. 4 is a light transmission spectrum of an optical body formed according to Example 2.

FIG. 4 illustrates examples of sample light transmission spectra. Lines 120 and 130 are the transmission spectra for the reflected polarization and pass polarization of an optical body without a compound of formula I, formula II, formula III, or formula IV. Lines 100 and 110 are the transmission spectra for the reflected polarization and the pass polarization for an optical body that includes the small molecule denoted as C2 (C2 Polymer w/C2 Add and C2 Polymer w/C2 Add Pass):

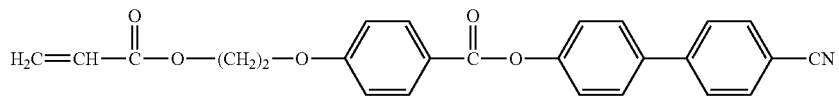

as an additive to cholesteric liquid crystal polymer as described above. FIG. 4 graphically shows that with the addition of the small molecule, both the spectral transparency is improved (% $T_{pass}$) and the spectral extinction (% $T_{min}$) is reduced leading to an improved maximum contrast ratio (CR). The contrast is graphically shown by the length of the double arrow lines showing the pass % transmission (% T) at a given wavelength.

Copolymer 12 wt % cyano biphenyl benzoate ethyl acrylate, 1 wt % Paliocolor LC756 (BASF, Charlotte, N.C.), 0.2 wt % Paliocolor LC242 (BASF, Charlotte, N.C.), 45 wt % Dioxolane, 37 wt % cyclohexanone, 2 wt % carbon tetrabromide, and 0.3% Vazo 52 (DuPont, Wilmington, Del.) and compound of formula I, formula II, or formula III were combined.

The compound of formula I, formula II, or formula III (in the amounts indicated in Table 2) were added in an amount 15.5% of the weight of the initial solids, typically with additional solvent. The resulting solutions were mixed until clear, and heated for about 14 hours under nitrogen at a temperature of 60° C. The mixed solutions were then coated on to 100 micron thick PET film (Scotch Par™, 3M, St. Paul, Minn.). The coated film was baked at about 120° C. for about 12 minutes. The spectrum of each coated film was then measured by using a Lambda 900 spectrophotometer (Perkin Elmer, Santa Clara, Calif.) with a Glan-Thomas polarizer and Newport zero order achromatic ¼ wave film in the optical path. The polarizer and quarter wave plate were oriented to give the minimum % transmission (extinction) of the spectra (% $T_{min}$). At the wavelength that produced the % $T_{min}$ value, the % transmission of pass of the spectra was measured (% $T_{pass}$) by rotating the polarizer 90°. The maximum contrast ratio (CR) is provided by dividing the % $T_{pass}$ by % $T_{min}$. The values observed are given in Table 2 below.

TABLE 2

| Co-polymer | % $T_{min}$ | % $T_{pass}$ | CR |
|---|---|---|---|
| control (no added small molecule) | 12 | 66.8 | 5.5 |
| H₂C=CH—C(=O)—O—(CH₂)₆—O—C₆H₄—C(=O)—O—C₆H₄—CN | 5.5 | 88 | 16 |
| H₂C=CH—C(=O)—O—(CH₂)₆—O—C₆H₄—C(=O)—O—C₆H₄—O—C(=O)—C₆H₄—F | 5.5 | 88 | 16 |
| H₂C=CH—C(=O)—O—(CH₂)₆—O—C₆H₄—C(=O)—O—C₆H₄—O—C(=O)—C₆H₄—CN | 13 | 85 | 6.5 |
| H₂C=CH—C(=O)—O—(CH₂)₂—O—C₆H₄—C(=O)—O—C₆H₄—O—C(=O)—C₆H₄—F | 5.7 | 88 | 15 |
| H₂C=CH—C(=O)—O—(CH₂)₂—O—C₆H₄—C(=O)—O—C₆H₄—O—C(=O)—C₆H₄—O—CH₃ | 6.1 | 88 | 14 |
| H₂C=CH—C(=O)—O—(CH₂)₂—O—C₆H₄—C(=O)—O—C₆H₄—O—C(=O)—C₆H₄—CF₃ | 7.9 | 88 | 11 |

TABLE 2-continued

| Co-polymer | % $T_{min}$ | % $T_{pass}$ | CR |
|---|---|---|---|
| 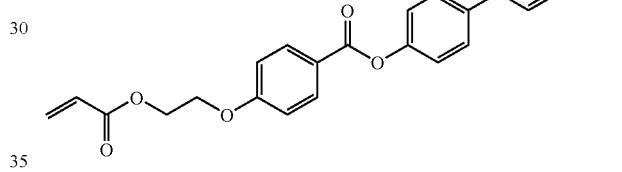 | 10 | 90 | 8.8 |

As can be seen from Table 2, while all of the co-polymerized small molecules that were utilized provided pass transmissions equal to or in excess of 85% which provides excellent transparency to the film. They all produced cholesteric liquid crystal layers with a similar or better (lower) extinction, versus control. Extinction values below 10% transmission indicate excellent alignment quality. In addition, all of the co-polymers tested produced cholesteric liquid crystal films with enhanced maximum contrast ratios verses the control.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A cholesteric liquid crystal composition comprising:
a) a cholesteric liquid crystal compound or a cholesteric liquid crystal precursor; and
b) a compound of formula (I) or formula (II):

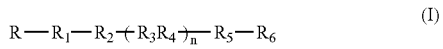
(I)

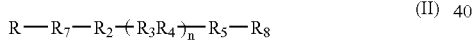
(II)

wherein,
n is 1 or 2;
R is an acrylate;
$R_1$ is a ($C_3$–$C_6$) alkylene;
$R_2$ is —O—;
$R_3$ is phenylene;
$R_4$ is —C(O)O— or —O(O)C;
$R_5$ is a bond or phenylene;
$R_6$ is cyano or F;
$R_7$ is a ($C_1$–$C_2$) alkylene; and
$R_8$ is F, $CF_3$, methoxy or butoxy; and wherein the cholesteric liquid crystal composition comprises a chiral molecular unit and an achiral molecular unit and the achiral molecular unit is a compound of formula (C2):

(C2)

2. The composition according to claim 1, wherein n is 1 or 2, R is acrylate, $R_1$ is ($C_3$–$C_6$) alkylene, $R_2$ is —O—, $R_3$ is phenylene, $R_4$ is —C(O)O—, or —O(O)C—, $R_5$ is a bond or phenylene and $R_6$ is F, or cyano.

3. The composition according to claim 1, wherein n is 1 or 2, R is acrylate, $R_7$ is ($C_1$–$C_2$) alkylene, $R_2$ is —O—, $R_3$ is phenylene, $R_4$ is —C(O)O—, or —O(O)C—, $R_5$ is a bond or phenylene and $R_8$ is F, $CF_3$, methoxy, or butoxy.

4. The composition according to claim 1, wherein the compound of formula (1) or formula (II) is:

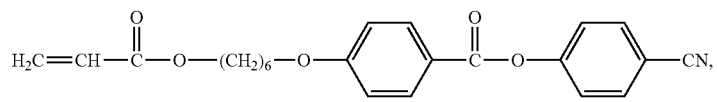

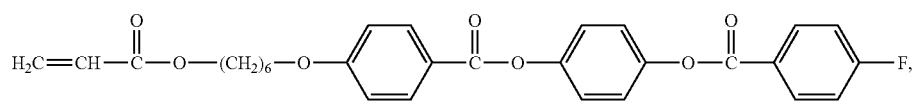

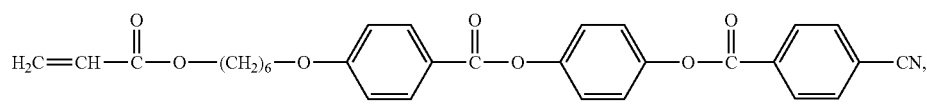

-continued

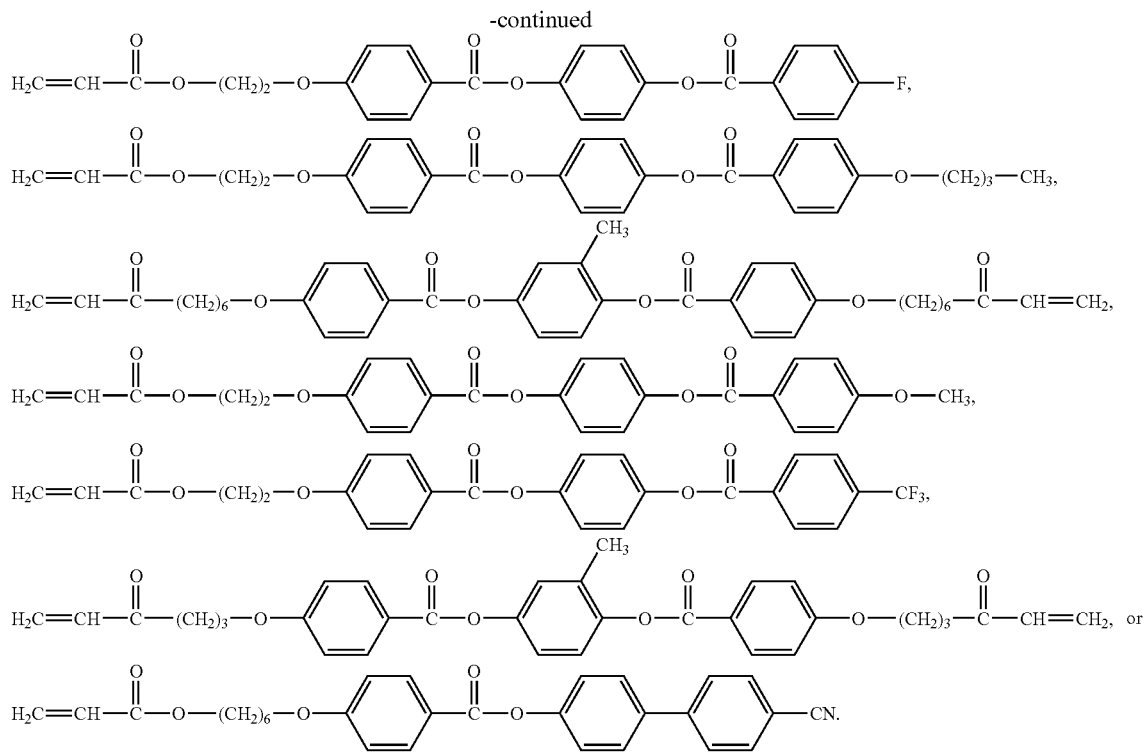

5. The composition according to claim 1, wherein the cholesteric liquid crystal composition with the compound of formula (I) or formula (II) has a minimum % transmission value at a minimum % transmission wavelength that is less than a minimum % transmission value of a cholesteric liquid crystal composition without the compound of formula (I) or formula (II).

6. The composition according to claim 5, wherein the cholesteric liquid crystal composition with the compound of formula (I) or formula (II) has a % pass transmission value at the minimum % transmission wavelength that is greater than that of a cholesteric liquid crystal composition without the compound of formula (I) or formula (II).

7. The composition according to claim 1, wherein the cholesteric liquid crystal composition with the compound of formula (I) or formula (II) has a maximum contrast ratio value that is greater than that of a cholesteric liquid crystal composition without the compound of formula (I) or formula (II).

8. An optical display comprising:
a display medium and a reflective polarizer comprising a cholesteric liquid crystal
composition according to claim 1.

9. A method of forming a cholesteric liquid crystal film comprising:
a) combining a cholesteric liquid crystal polymer with a compound of formula (IV):

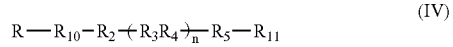 (IV)

wherein,
n is 1, 2, 3, or 4;
R is an acrylate, methacrylate, acrylamide, isocyanate, epoxy, or silane;

$R_{10}$ is $(C_1-C_8)$ alkylene, $(C_1-C_8)$ alkenylene, or $(C_1-C_8)$ alkylyne;
$R_2$ is a bond, —O—, —C(O)O—, —O(O)C—, —OC(O)O—, —C(O)N—, —CH=N—, —N=CH—, or —NC(O)—;
$R_3$ is a cycloalkylene, cycloalkenylene, heterocyclylene, arylene, or hetroarylene;
$R_4$ is a bond, $(C_1-C_8)$ alkylene, $(C_2-C_8)$ alkenylene, $(C_2-C_8)$ alkylyne, carbonyl, —O—, —C(O)O—, —O(O)C—, —OC(O)O—, —C(O)N—, —CH=N—, —N=CH—, or —NC(O)—;
$R_5$ is a bond, cycloalkylene, cycloalkenylene, hetrocyclylene, arylene, or hetroarylene; and
$R_{11}$ is hydrogen, cyano, halo, $(C_1-C_8)$ alkoxy, $(C_1-C_8)$ alkyl, nitro, amino, carboxy, mercapto, $(C_1-C_4)$thioalkyl, $COCH_3$, $CF_3$, $OCF_3$, or $SCF_3$;
b) disposing the cholesteric liquid crystal polymer and compound of formula (IV) on a substrate; and
c) aligning the cholesteric liquid crystal polymer to form a cholesteric liquid crystal film;
wherein the cholesteric liquid crystal mixture comprises 5 to 20 wt % compound of formula (IV).

10. The method according to claim 9, wherein the combining a cholesteric liquid crystal polymer with a compound of formula (IV) comprises combining a cholesteric liquid crystal polymer with a compound of formula (IV), wherein n is 1 or 2, R is acrylate, $R_1$ is $(C_2-C_6)$ alkylene, $R_2$ is —O—, $R_3$ is phenylene, $R_4$ is —C(O)O—, or —O(O)C—, $R_5$ is a bond or phenylene and $R_6$ is F, cyano, $CF_3$, methoxy, or butoxy.

11. The method according to claim 9, wherein the combining a cholesteric liquid crystal polymer with a compound of formula (IV) comprises combining a cholesteric liquid crystal polymer with a compound of formula (IV), wherein the compound of formula (IV) is:

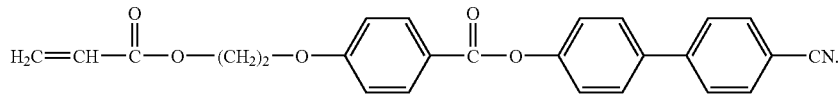

12. The method according to claim 9, wherein the aligning the cholesteric liquid crystal polymer forms a cholesteric liquid crystal film having a minimum % transmission value at a minimum % transmission wavelength that is less than a minimum % transmission value of a cholesteric liquid crystal film without the compound of formula (IV).

13. The method according to claim 12, wherein the aligning the cholesteric liquid crystal polymer forms a cholesteric liquid crystal film having a % pass transmission value at the minimum % transmission wavelength that is greater than that of a cholesteric liquid crystal film without the compound of formula (IV).

14. The method according to claim 9, wherein the aligning the cholesteric liquid crystal polymer forms a cholesteric liquid crystal film having having a maximum contrast ratio value that is greater than that of a cholesteric liquid crystal film without the compound of formula (IV).

15. The method according to claim 9, further comprising curing the compound of formula (IV) within the cholesteric liquid crystal film.

* * * * *

UNITED STATES PATENT AND TRADEMARK OFFICE
CERTIFICATE OF CORRECTION

PATENT NO. : 7,160,586 B2
APPLICATION NO. : 10/652700
DATED : January 9, 2007
INVENTOR(S) : Marc D. Radcliffe It is certified that error appears in the above-identified patent and that said Letters Patent is hereby corrected as shown below:

<u>Title Page, in the Abstract Item (57)</u>
Line 23, before "hydrogen" delete "is".

<u>Title Page, Other Publications Item (56)</u>
Line 5, delete "et al:" and insert -- et al.: --, therefor.
Line 6, delete "on" and insert -- of --, therefor.

<u>Column 2</u>
Line 13, before "hydrogen" delete "is".

<u>Column 3</u>
Line 46, delete "tern" and insert -- term --, therefor.

<u>Column 4</u>
Line 15, delete "carbon carbon" and insert -- carbon-carbon --, therefor.

<u>Column 5</u>
Line 44, delete "2diyl," and insert -- 2-diyl, --, therefor.

<u>Column 7</u>
Line 10, delete "(e g.," and insert -- (e.g., --, therefor.
Line 13, delete "precurser)" and insert -- precursor) --, therefor.

<u>Column 9</u>
Line 49, delete "$(C_{1-4})$" and insert -- $(C_1-C_4)$ --, therefor.
Line 50, delete "$(C_{1-2})$" and insert -- $(C_1-C_2)$ --, therefor.

<u>Column 13</u>
Line 4, delete "cholestric" and insert -- cholesteric --, therefor.
Line 25, delete "ration" and insert -- ratio --, therefor.

<u>Column 14</u>
Line 3, delete "half life" and insert -- half-life --, therefor.

<u>Column 16</u>
Line 3, delete "no" and insert -- $n_o$ --, therefor.
Line 3, delete "ne" and insert -- $n_e$ --, therefor.

UNITED STATES PATENT AND TRADEMARK OFFICE
CERTIFICATE OF CORRECTION

PATENT NO. : 7,160,586 B2
APPLICATION NO. : 10/652700
DATED : January 9, 2007
INVENTOR(S) : Marc D. Radcliffe It is certified that error appears in the above-identified patent and that said Letters Patent is hereby corrected as shown below:

Column 19
Line 16, delete "(3 a):" and insert -- (3a): --, therefor.
Line 35, after "psi" insert -- (about__Pa) --.
Line 53, after "acetonitrile" insert -- . --.

Column 20
Line 20, delete "4-[(4-trifluoromenthylbenzoyl)oxy]phenyl" and insert -- 4-[(4-trifluoromethylbenzoyl)oxy]phenyl --, therefor.
Line 21, delete "(3c ):" and insert -- (3e): --, therefor.
Line 36, delete "recystallized" and insert -- recrystallized --, therefor.
Line 41, after "psi" insert -- (about__Pa) --.

Column 22
Line 65, delete "834757" and insert -- 834754 --, therefor.

Column 26
Line 29, delete "$T_{pass\ by\ \%\ Tmin}$" and insert -- $T_{pass}$ by % $T_{min}$ --, therefor.

Column 28
Line 51, in Claim 4, delete "(1)" and insert -- (I) --, therefor.

Columns 29-30
Line 3, in Claim 4, below "CH$_3$," delete

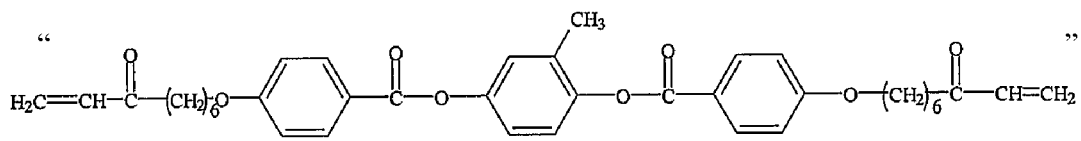

Line 6, in Claim 4, before "or" delete

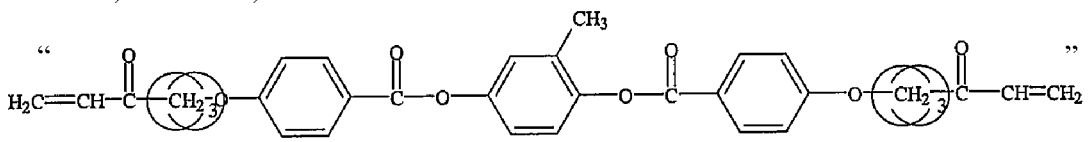

UNITED STATES PATENT AND TRADEMARK OFFICE
CERTIFICATE OF CORRECTION

PATENT NO. : 7,160,586 B2
APPLICATION NO. : 10/652700
DATED : January 9, 2007
INVENTOR(S) : Marc D. Radcliffe It is certified that error appears in the above-identified patent and that said Letters Patent is hereby corrected as shown below:

<u>Column 32</u>
Line 11, in Claim 14, delete "having" before "a".

Signed and Sealed this

Sixth Day of November, 2007

JON W. DUDAS
*Director of the United States Patent and Trademark Office*